(12) United States Patent
Elliott

(10) Patent No.: US 11,640,312 B2
(45) Date of Patent: May 2, 2023

(54) SYSTEM RESET USING A CONTROLLER

(71) Applicant: HEWLETT PACKARD ENTERPRISE DEVELOPMENT LP, Houston, TX (US)

(72) Inventor: Robert C. Elliott, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 479 days.

(21) Appl. No.: 16/803,304

(22) Filed: Feb. 27, 2020

(65) Prior Publication Data
US 2021/0271501 A1  Sep. 2, 2021

(51) Int. Cl.
G06F 9/455 (2018.01)
G06F 13/42 (2006.01)
G06F 13/16 (2006.01)
G06F 9/48 (2006.01)

(52) U.S. Cl.
CPC ........ G06F 9/45558 (2013.01); G06F 9/4812 (2013.01); G06F 13/1668 (2013.01); G06F 13/4204 (2013.01); G06F 2009/45575 (2013.01)

(58) Field of Classification Search
None
See application file for complete search history.

(56) References Cited

U.S. PATENT DOCUMENTS

| | | | |
|---|---|---|---|
| 8,074,262 B2 | 12/2011 | Scarlata | |
| 8,239,667 B2 | 8/2012 | Durham | |
| 8,645,605 B2 | 2/2014 | Subramaniyan et al. | |
| 8,892,802 B2 | 11/2014 | Amit et al. | |
| 8,954,965 B2 | 2/2015 | Novak et al. | |
| 9,600,313 B2 | 3/2017 | Nimmagadda et al. | |
| 9,990,220 B2 | 6/2018 | Vavrick et al. | |
| 10,268,500 B2 | 4/2019 | Liguori et al. | |
| 10,318,311 B2 | 6/2019 | Liguori et al. | |
| 10,382,195 B2 | 8/2019 | Brandwine et al. | |
| 2010/0125723 A1* | 5/2010 | Cooper | G06F 9/4411 713/1 |
| 2015/0160960 A1* | 6/2015 | Delco | G06F 9/45545 718/1 |
| 2016/0124751 A1* | 5/2016 | Li | G06F 9/45541 713/100 |
| 2016/0283425 A1* | 9/2016 | Sarangdhar | G06F 13/362 |
| 2017/0139721 A1* | 5/2017 | Feehrer | G06F 13/20 |

OTHER PUBLICATIONS 1 of 4—Unified EFI, Inc., Advanced Configuration and Power Interface Specification, Version 6.0, Apr. 2015 (pp. 1-219).

(Continued)

Primary Examiner — Lewis A Bullock, Jr.
Assistant Examiner — Melissa A Headly
(74) Attorney, Agent, or Firm — Trop, Pruner & Hu, P.C.

(57) ABSTRACT

In some examples, a storage medium stores information relating to reset ports associated with respective virtual machines (VMs) of a plurality of VMs. A controller detects, based on the information, an activation of a first reset port associated with a first VM of the plurality of VMs. In response to the detecting, the controller provides an indication of the activation of the first reset port to a hypervisor that is separate from the controller, the indication to cause the hypervisor to reset the first VM.

20 Claims, 5 Drawing Sheets

(56) References Cited

OTHER PUBLICATIONS 2 of 4—Unified EFI, Inc., Advanced Configuration and Power Interface Specification, Version 6.0, Apr. 2015 (pp. 220-481).
3 of 4—Unified EFI, Inc., Advanced Configuration and Power Interface Specification, Version 6.0, Apr. 2015 (pp. 482-744).
4 of 4—Unified EFI, Inc., Advanced Configuration and Power Interface Specification, Version 6.0, Apr. 2015 (pp. 745-1012).
Andre Richter et al., "Performance Isolation Exposure in Virtualized Platforms with PCI Passthrough I/o Sharing," 2014, pp. 1-12, Springer International Publishing, Switzerland.
Berger et al., vTPM: Virtualizing the Trusted Platform Module, USENIX Association, Security '06, 15th USENIX Security Symposium, 2006 (16 pages).
Elliott et al., U.S. Appl. No. 16/803,293 entitled Virtual Serial Ports for Virtual Machines filed Feb. 27, 2020 (32 pages).
Felipe Huici et al., "Change: Enabling Innovation in the Internet Architecture Through Flexible Flow-processing Extensions," Apr. 23, 2014, pp. 1-72, CHANGE Consortium.
George Crump, "Offloading I/O from the Hypervisor with SR-IOV," Sep. 29, 2010, pp. 1-3, Retrieved from the Internet on Oct. 18, 2019 at URL: <storage-switzerland.com/Articles/Entries/2010/9/29_Offloading_I_O_from_the_Hypervisor_with_SR-IOV.html>.
HP, Technical White Paper, Implementing Windows Server 2012 SR-IOV (16 pages).
Intel, PCI-SIG Single Root I/O Virtualization (SR-IOV) Support in Intel® Virtualization Technology for Connectivity, White Paper, 2008 (4 pages).
Intel, PCI-SIG SR-IOV Primer, An Introduction to SR-IOV Technology, Intel® LAN Access Division, 321211-002, Revision 2.5, Jan. 2011 (28 pages).
Javier Echave, "Hyperflex Architecture and How It Works," Mar. 7, 2017, pp. 1-4, Retrieved from the Internet on Oct. 18, 2019 at URL: <gblogs.cisco.com/ch-tech/hyperflex-architecture-and-how-it-works/>.
Lenovo, A Technical Introduction to the Use of Trusted Platform Module 2.0 with Linux, Last Update: Sep. 8, 2017 (28 pages).
Marcus Sundberg and Erik Nilsson, "Emulation of TPM on Raspberry Pi," Master's Thesis, Mar. 19, 2015, pp. 1-77, Lund University, Sweden.
Microsoft Docs—Guarded fabric and shielded VMs overview, Aug. 28, 2018 (13 pages).
Microsoft Docs, Trusted Execution Environment ACPI Profile, Oct. 10, 2018 (33 pages).
Mike Foley, blogs.vmware.com, vSphere 6.7—Virtual Trusted Platform Modules, May 2, 2018 (14 pages).
PCI-SIG, PCI Code and ID Assignment Specification, Revision 1.11, Jan. 24, 2019 (25 pages).
Robert C. Elliott, U.S. Appl. No. 16/803,308 entitled Virtual Trusted Platform Modules filed Feb. 27, 2020 (30 pages).
Scott's Weblog, What is SR-IOV? Dec. 2, 2009 (5 pages).
Sourceforge, kagoldman, IBM's Software TPM 2.0 Last Update Apr. 10, 2019 (4 pages).
SR-IOV Virtual Functions (VFs), Windows drivers_Microsoft Docs, Apr. 19, 2017 (1 page).
TCG ACPI Specification, Family "1.2" and "2.0", Version 1.2, Revision 8, Aug. 18, 2017 (23 pages).
TCG PC Client Platform Firmware Profile Specification, Family "2.0", Level 00 Revision 1.04, Jun. 3, 2019 (123 pages).
Wikipedia, Single-root input/output virtualization last edited Sep. 26, 2019 (4 pages).
Zimmerman, Google Cloud, Identity & Security, Virtual Trusted Platform Module for Shielded VMs: security in plaintext, Aug. 6, 2018 (9 pages).

* cited by examiner

SYSTEM RESET USING A CONTROLLER

BACKGROUND

A computer system includes various electronic components, such as a processor, a memory, a persistent storage, a network interface controller, and so forth. Machine-readable instructions, including software programs and/or firmware programs, can be executed on the processor. A user, a program, or an electronic component can cause a reset of the computer system.

BRIEF DESCRIPTION OF THE DRAWINGS

Some implementations of the present disclosure are described with respect to the following figures.

Figure 1A:
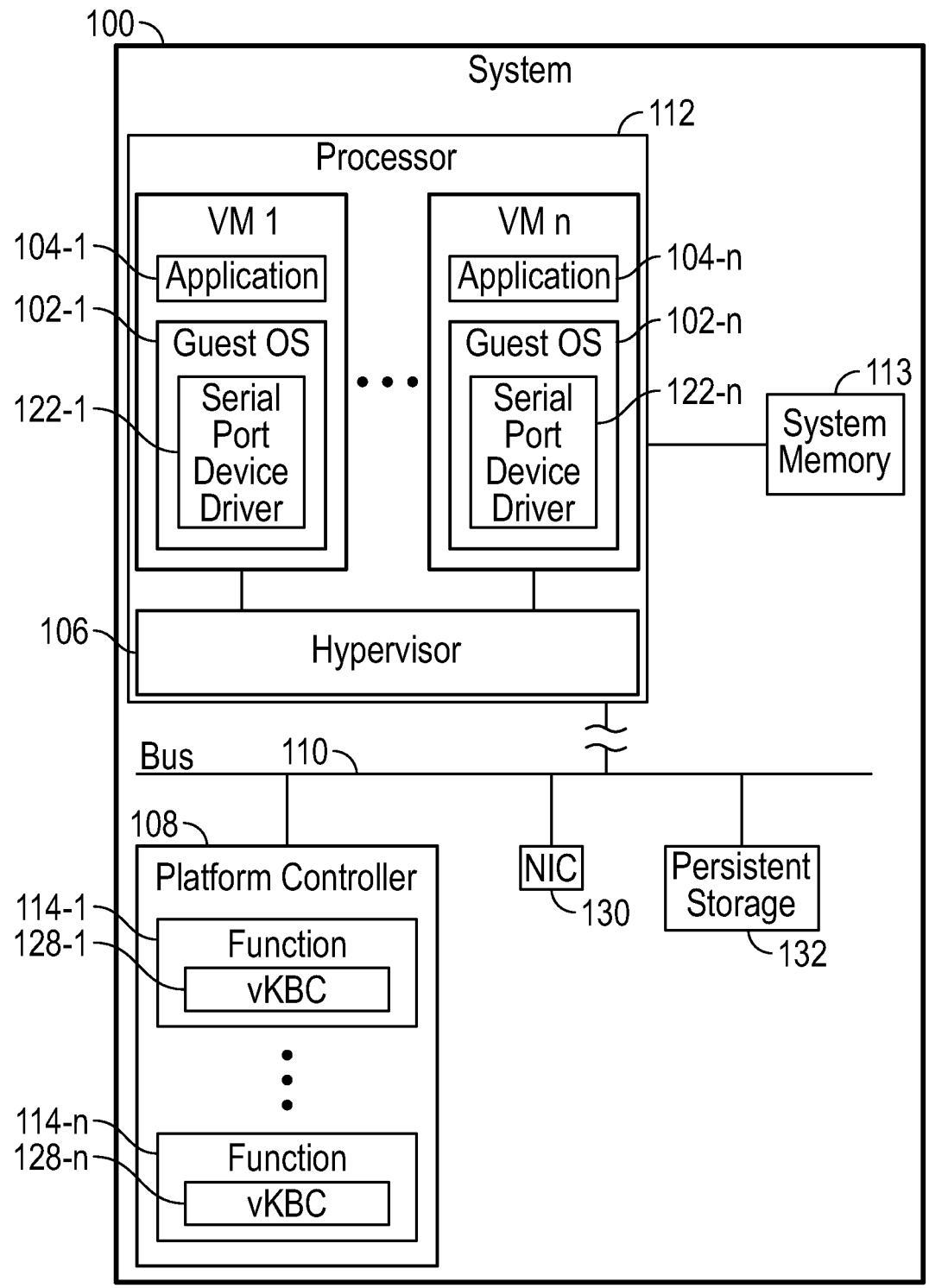
FIG. 1A is block diagram of a system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of computer systems can include any of the following: a desktop computer, a notebook computer, a tablet computer, a server computer, a smartphone, a wearable device (e.g., a smart watch, smart eyeglasses, a head-mounted device, etc.), a game appliance, an Internet-of-Things (IoT) device, a printing system, a storage appliance, a communication node, and so forth.

A reset of a computer system can be triggered by a user, a program, or an electronic component. For example, a user can activate a combination of specified keys of a keyboard to trigger the reset. Alternatively, a user can activate a control element in a graphical user interface (GUI) of the computer system to trigger the reset. A program (whether executing in the computer system or external of the computer system) can issue a command or other indication to cause reset of the computer system. An electronic component (whether in the computer system or external of the computer system) can issue a signal or other indication to cause reset of the computer system.

A "reset" of a computer system can refer to restarting the computer system (powering off the computer system followed by powering on the computer system), rebooting the computer system (maintaining the computer system powered but shutting down an operating system (OS) of the computer system followed by booting the OS), or otherwise causing the computer system to clear state information of programs in the computer system (including the OS, application programs, etc.) and starting the programs with the state information cleared.

In some examples, a reset of a computer system can be triggered by activating a reset port of the computer system. This activation of the reset port can be accomplished by writing a specified value (e.g., FEh where "h" represents hexadecimal) to a specified reset port address (e.g., address 64$h$ in an input/output (I/O) address space). The reset port address 64$h$ can be the address of a register ("reset register") in the I/O address space.

In some examples, the reset port may be part of a keyboard controller, such that in response to the write of the specified value to the reset port address (e.g., write of FEh to address 64$h$), the keyboard controller performs a reset of the computer system.

Some computer systems may implement virtualization, in which multiple virtual machines (VMs) can be executed in a computer system (such VMs are also considered to be hosted by the computer system). The VMs can share the physical resources (e.g., a processor, a memory, a persistent storage, a network interface controller, etc.) of the computer system. A "virtual machine" or "VM" can refer to a partition of a computer system in which machine-readable instructions (e.g., a guest OS, an application program, etc.) can run while being isolated from machine-readable instructions executed in another VM. In some examples, a container can also be considered a VM.

A computer system that implements virtualization can also include a hypervisor, which is also referred to as a virtual machine monitor (VMM). The hypervisor (which includes machine-readable instructions) can create VMs that are run in the computer system, and the hypervisor can manage the execution of the VMs and the sharing of computer system physical resources by the VMs. The hypervisor can emulate the physical resources of the computer system such that a VM can access the emulated physical resources, and the hypervisor can provide isolation between VMs.

A program executing in a VM, or a user interacting with the VM, may trigger a reset of the VM. Since a computer system that hosts the VM can include multiple VMs, the reset triggered via the VM should reset just the VM, and not the computer system. Resetting the computer system would cause the other VMs hosted by the computer system as well as other functionalities and services of the computer system to become unavailable during the reset.

In some examples, a hypervisor can emulate a keyboard controller, or more specifically, a reset port of a keyboard controller. When a given VM activates a reset port of the keyboard controller (such as by writing the specified value to the reset port address), the emulated keyboard controller (as emulated by the hypervisor) performs the reset of the given VM. However, the emulated keyboard controller consumes physical resources of the computer system, including processor resources. In response to a write to the reset port address by each VM, the emulated keyboard controller (as emulated by the hypervisor) checks if the value that is written to the reset port address matches the specified value (e.g., FEh). In a computer system including a large number of VMs, the emulated keyboard controller can consume cycles of a processor, which can slow down other operations of the computer system. As another example, a VM infected with malware or a VM that is malfunctioning may issue a large number of writes to the reset port address with values other than the specified value (e.g., FEh), which can cause the computer system to slow down if keyboard controller emulation is performed by the hypervisor to handle such writes.

In accordance with some implementations of the present disclosure, instead of emulating a keyboard controller reset port using a hypervisor to handle reset port activations by VMs, reset port emulation can be offloaded to a platform controller that is separate from the hypervisor. A "platform controller" can refer to a controller that performs specified tasks in a computer system. In some examples, the platform controller is a bus device on a bus, such as a Peripheral Component Interconnect (PCI) bus. In more specific examples, the PCI bus can be a PCI Express (PCIe) bus. In other examples, the platform controller can be a bus device connected to another type of bus in a system. A "bus" refers to a communication link over which multiple devices can communicate with one another.

The platform controller is separate from the main processor of the system, where the main processor can execute various machine-readable instructions of the system, such as VMs, an operating system, an application program, firmware (e.g., boot code, hardware initialization code, etc.), and so forth. The platform controller can be designated to perform specified tasks of the system, including emulation of reset ports as well as other tasks (e.g., power management tasks, thermal management tasks, system monitoring tasks, etc.). In some examples, the platform controller can be a separate system-on-chip coupled to the main processor. In more specific examples, the platform controller can be made from a smart network interface controller (NIC), or be part of a baseboard management controller (BMC). The platform controller can have its own processing circuitry (that is separate from the main processor executing the OS and/or other program code of a computer system) and run its own firmware. A BMC is a specialized service processor that can monitor the physical state of a computer system using sensors and communicates with a management system through an independent out-of-band connection.

The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware components located in the computer system. The BMC may be able to directly modify the hardware components. The BMC may operate independently of the OS of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup, OS image deployment and recovery, system security, and so forth.

In some examples, a BMC can provide so-called "lights-out" functionality for computer systems. The lights out functionality may allow a user, such as a systems administrator to perform management operations on the computer system even if an OS is not installed or not functional on the computer system. Moreover, in some examples, the BMC can run on auxiliary power (e.g., battery power or an auxiliary power rail); as a result, the computer system does not have to be powered on to allow the BMC to perform its operations. The services provided by the BMC may be considered "out-of-band" services, since the OS may not be running and in some cases the computer system may be powered off or is not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface) and is available whether the computer system is in a powered on state. In some examples, the BMC is an example of the platform controller.

The platform controller provides a separate physical processor (separate from the main processor of the system) in which keyboard emulation can be provided in a secure manner. For example, the platform controller is protected against attacks which may affect operations of the main processor, such as when malware infects a system and executes on the main processor.

Offloading reset port emulation to the platform controller reduces processor resource consumption overhead by the hypervisor to perform a reset of a VM. In some examples, a portion of a PCI memory is assigned to include register sets associated with respective VMs, where each register set includes a reset register that when written to with a specified value causes a reset of the corresponding VM. Writes to the PCI memory portion containing the reset registers can be detected by the keyboard controller.

FIG. 1A is a block diagram of a system 100. The system 100 can include a computer system or multiple computer systems.

The system 100 includes n VMs (VM 1 to VM n depicted in FIG. 1), where n 1. VMs can be started on demand by a user or other entity. The system 100 can start with zero VMs, and additional VM(s) is (are) started when requested. Each VM includes a respective guest OS. VM 1 includes a guest OS 102-1, and VM n includes a guest OS 102-n. Examples of the guest OSes include a LINUX OS, a WINDOWS OS, and/or other types of OSes. The different guest OSes 102-1 to 102-n can be of the same type or of different types. Each VM can also include a respective application program (or multiple application programs) executing in the VM. For example, VM 1 includes an application program 104-1, and VM n includes an application program 104-n. Note that prior to the creation of a VM, there is no guest OS 102-i (i=1 to n) and no application program 104-i.

The system 100 further includes a hypervisor 106 that creates the VMs, manages execution of the VMs, emulates physical resources of the system 100 that are accessible by the VMs, provides isolation between the VMs, and performs other virtualization tasks.

In accordance with some implementations of the present disclosure, instead of emulating a keyboard controller reset port using the hypervisor 106, reset port emulation can be offloaded to a platform controller 108 of the system 100. In some examples, the platform controller 108 is a bus device on a bus 110 of the system 100. For example, the bus 110 can be a PCIe bus. In other examples, the bus 110 can be a different type of bus or other type of communication fabric.

The platform controller 108 can be implemented using any type of hardware processing circuitry, including, as examples, a microcontroller, a programmable integrated circuit device (such as an application specific integrated circuit or ASIC device), a programmable gate array, a microprocessor, or any other type of hardware processing circuit.

In some examples, the platform controller 108 is separate and distinct from a processor (or processors) 112 of the system 100. A processor can include a microprocessor, a core of a multi-core microprocessor, a microcontroller, a programmable integrated circuit, a programmable gate array, a digital signal processor, or another hardware processing circuit.

The processor 112 is coupled to the bus 110, either directly or through another device, such as a bridge device. The processor 112 executes machine-readable instructions of the system 100, including the hypervisor 106 and the VMs, a host OS (if present), as well as other programs (including software programs and/or firmware programs).

The processor 112 can be coupled to a system memory 113, which can include a memory device or multiple memory devices to store data and machine-readable instructions. A memory device can include a volatile memory device such as a dynamic random access memory or DRAM device, a static random access memory or SRAM device, etc.). Alternatively, a memory device can include a nonvolatile memory device. Although not shown, the system memory 113 can include a memory controller, or alternatively, a memory controller is connected to the memory device(s) to control access of data in the memory device(s).

Other devices can also be connected to the bus 110, including a network interface controller (NIC) 130 and a persistent storage 132. The NIC 130 is able to communicate over a network, such that components of the system 100, including the VMs, are able to communicate with other entities over the network through the NIC 130. In some examples, a physical keyboard controller may also be connected to the bus 110.

The persistent storage 132 can store data that persists even if power is removed from the system 100 or the persistent storage 132. The persistent storage 132 can be implemented using a nonvolatile storage device (or multiple nonvolatile storage devices). A nonvolatile storage device can include a flash memory device, a disk-based storage device, and so forth.

In examples according to FIG. 1A, reset port emulation can be performed using PCI functions 114-1 to 114-$n$ that are provided by the platform controller 108. The hypervisor 106 can assign a PCI function (or multiple PCI functions) to each VM. The PCI functions 114-1 to 114-$n$ contain respective virtual keyboard controllers (vKBCs) 128-1 to 128-$n$. Instead of implementing physical keyboard controllers, vKBCs 128-1 to 128-$n$ contained in the PCI functions 114-1 to 114-$n$ are provided by the platform controller 108.

Figure 1B:
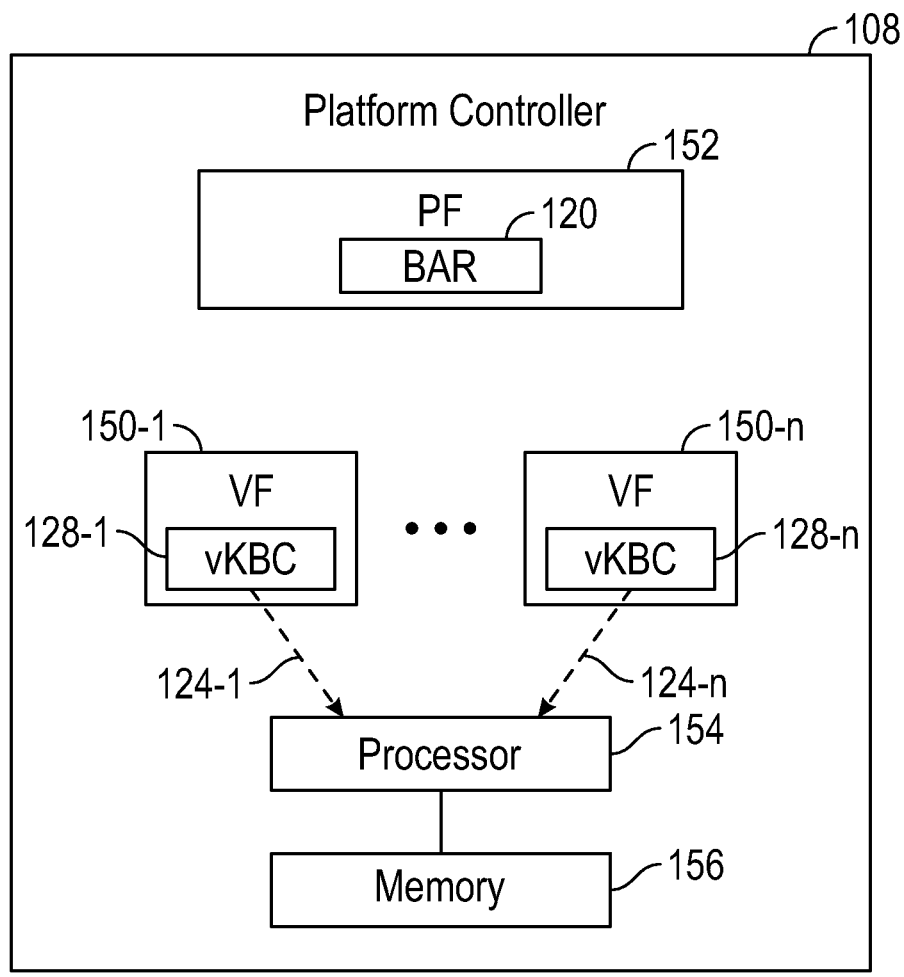
FIG. 1B is a block diagram of a platform controller according to some examples.

FIG. 1B shows further details of the platform controller 108 according to some examples. The platform controller 108 can have other implementations in other examples. In some examples, the PCI functions 114-1 to 114-$n$ of FIG. 1A are implemented as virtual functions (VFs) 150-1 to 150-$n$ that are according to PCIe single root I/O virtualization (SR-IOV), as defined by a PCI Special Interest Group (SIG), which is a community that defines standards (including the SR-IOV Specification) relating to PCIe. Each VF 150-$i$ contains a corresponding vKBC 128-$i$. In the example of FIG. 1B, the VF 150-1 is assigned to VM 1, the VF 150-$n$ is assigned to VM n, and so forth. Each VF can support a unique and separate data path for I/O-related functions (e.g., reset port writes) within the PCIe hierarchy. The vKBC 128-1 emulates a reset port for VM 1, and the vKBC 128-$n$ emulates the reset port for VM n.

In other examples, the PCI functions 114-1 to 114-$n$ of FIG. 1A can be implemented as another type of function.

SR-IOV allows a PCIe device (such a keyboard controller implemented by the platform controller 108 of FIG. 1B) to present itself to a host (e.g., the system 100) as multiple distinct virtual devices. The PCIe device (e.g., the platform controller 108) implements a PCIe physical function (PF) 152 that is partitioned into multiple VFs (e.g., 150-1 to 150-$n$ shown in FIG. 1B) for the purpose of sharing the PCIe device's resources in a virtual environment.

The PF 152 provides control over the creation and allocation of VFs. The PF 152 contains an SR-IOV capability structure and manages the SR-IOV functionality. The PF 152 can be discovered, managed, and manipulated like any other PCIe device in the system 100 of FIG. 1A.

The VFs 150-1 to 150-$n$ share the platform controller's underlying hardware and PCIe interface to the PCI bus 110.

The platform controller 108 of FIG. 1B further includes a processor 154 and a memory 156. The processor 154 of FIG. 1B is to execute instructions of the platform controller 108 to perform tasks of the platform controller 108.

In accordance with some implementations of the present disclosure, SR-10V enables reset port activations by VMs to bypass an emulation layer in the hypervisor 106. VFs according to SR-IOV are lightweight so that a large number of VFs can be implemented in the platform controller 108. For example, if the system 100 includes a large number of VMs, a corresponding large number of VFs can be implemented on the platform controller 108 to perform reset port emulation for the respective VMs.

An SR-IOV-capable device (e.g., the platform controller 108) can be configured (such as by the hypervisor 106 or another entity in the system 100) to appear in the PCI memory or I/O space as multiple VFs, where each VF has its own PCI configuration space. A PCI memory or I/O space can refer to a portion of memory or I/O space in the system 100 that includes structures (e.g., registers) that can be used by an entity (e.g., a VM or any other entity) in the system 100 to interact with a corresponding PCI device, such as any of the VFs 150-1 to 150-$n$.

In some examples, to perform keyboard controller reset port emulation, each VF 150-1 to 150-$n$ has a class code that represents a keyboard controller. According to PCIe, a class code is a three-byte field in a function's configuration space header that identifies a functionality of the function. For example, a class code can include a base class sub-field (one byte in length, for example), a subclass sub-field (one byte in length, for example), and a programming interface sub-field (one byte in length, for example). The base class sub-field broadly classifies the type of functionality that the VF provides. The subclass sub-field more specifically identifies the type of functionality that the VF provides. The programming interface sub-field identifies the specific register-level interface (if any) of a VF, so that a device-independent software (e.g., a VM) can interact with the VF. For example, a class code value of 09h/00h/00h assigned to a VF indicates that the VF corresponds to a keyboard controller. In other examples, other class code values can represent a keyboard controller.

Figure 2A:
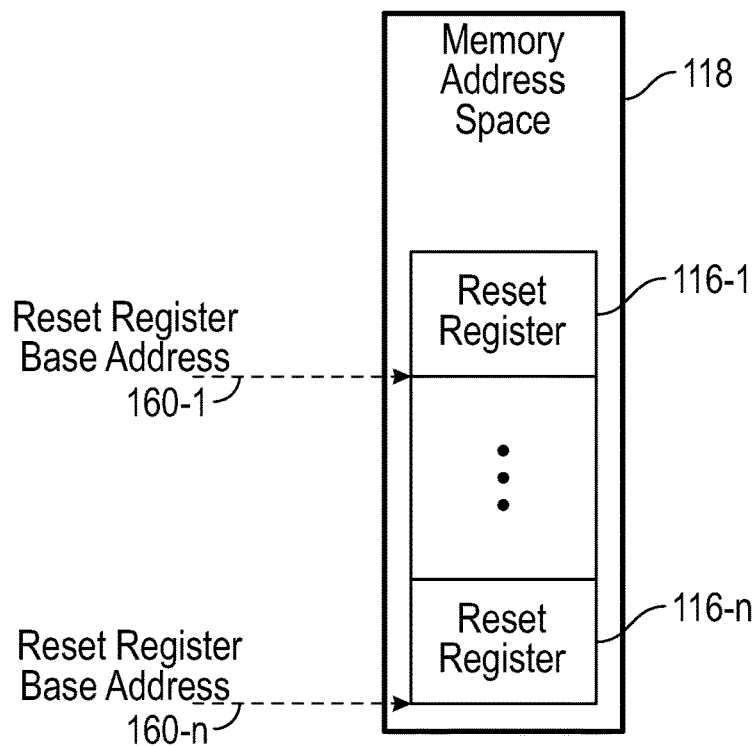
FIGS. 2A-2B are block diagrams of memory address spaces according to some examples.

In some examples, VM i (i=1 to n) can recognize based on the base class sub-field and the subclass sub-field together that a VF 150-*i* (i=1 to n) is providing the functionality of a keyboard controller. The programming interface sub-field can identify a reset register (shown as 116-*i* (i=1 to n) in FIG. 2A) associated with each corresponding VF 150-*i* that VM i can interact with (e.g., write a specified value to the reset register 116-*i* to cause a reset of VM i). The multiple VFs 150-1 to 150-*n* appear as multiple reset ports that corresponding VMs can use to reset the VMs. Each reset register 116-*i* is part of a corresponding vKBC 128-*i*. The s reset register 116-*i* in the corresponding vKBC 128-*i* is mapped to a memory address space 118, and more specifically, to PCI memory in the memory address space 118. The memory address space 118 can be implemented with a number of storage devices in the system 100, including the system memory 113 of FIG. 1A, registers in the platform controller 108, and so forth. The reset registers 116-1 to 116-*n* include memory-mapped registers that are part of the memory address space 118.

In alternative examples, such as in examples where the functions 114-1 to 114-*n* are PFs, then the reset registers 116-1 to 116-*n* can be part of an I/O address space.

Implementing the reset registers 116-1 to 116-*n* in the memory space can be more efficient than implementing reset registers in the I/O space (such as in implementations where SR-IOV is not used), since I/O space accesses of reset registers can slow down operations of the processor 112.

Memory addresses of the memory address space 118 can be mapped to a memory controller and/or a PCIe controller. The memory controller is connected to a memory device (or alternatively, multiple memory devices). A memory device can include a volatile memory device (e.g., a dynamic random access memory or DRAM device, a static random access memory or SRAM device, etc.). Alternatively, a memory device can include a nonvolatile memory device (e.g., a flash memory device, etc.). A PCIe controller is connected to a PCIe device. A PCIe device can support memory accesses, but they may not really access memory devices such as DRAMs or SRAMs. Instead, a PCIe device may access memory-mapped registers that are part of the memory address space 118.

In some examples, the starting address (or base address) of the PCI memory space for each reset register 116-*i* is based on a memory address contained in a PCI base address register (BAR) 120, which is in the PCI configuration space. The PCI BAR 120 is included in the PF 152, as shown in FIG. 1B. PCI defines multiple BARs that can be used to hold various memory addresses for a PCI device or function.

The reset register base addresses 160-1 to 160-*n* of the PCI memory spaces containing the respective reset registers 116-1 to 116-*n* are derived based on the memory address contained in the BAR 120. The hypervisor 106 writes the memory address to the BAR 120. The memory address contained in the BAR 120 defines a chunk of PCI memory space that is to be partitioned evenly across the VFs 150-1 to 150-*n*. The defined chunk of PCI memory space has a size BARSIZE. Each VF is assigned a portion of the chunk of PCI memory space of size BARSIZE/n. The reset register base address 160-*i* of the PCI memory containing the reset register 116-*i* is computed based on the VF number of VF 150-*i* in conjunction with the BAR 120.

A keyboard controller device driver (or another program) that is in a VM is able to access the PCI memory space of the corresponding VF. As shown in FIG. 1A, multiple keyboard controller device drivers 122-1 to 122-*n* are included in respective guest OSes 102-1 to 102-*n*.

In some examples, a guest OS 102-*i* in VM i can include an application programming interface (API) that allows the keyboard controller device driver 122-*i* in VM i to access the PCI memory space of the VF 150-*i*.

After SR-IOV is enabled in the PF 152 of the platform controller 108, the VF instances 150-*i* are available for enumeration by configuration software running on the processor 112 and can be accessed by bus, device and function. The configuration software, which in some examples is the hypervisor 106, can then configure the desired number of VF instances 150-*i* from those supported by the PF 152 and assign resources accordingly (i.e., assign a portion of the memory space 118 for the VF instances 150-*i* by programming the BAR 120). Once complete, the reset registers 116-*i* are addressable by the processor 112

The keyboard controller device driver 122-*i* in the guest OS 102-*i* is able to query the hypervisor 106 to obtain the corresponding reset register base address 160-*i* being accessed by the keyboard controller device driver 122-*i*. This allows the keyboard controller device driver 122-*i* in the guest OS 102-*i* to write to the reset register 116-*i*.

Each vKBC 128-*i* can include a reset register write detection logic to detect a write by VM i to the reset register 116-*i*. A reset register write to the reset register 116-*i* is directed to the respective vKBC 128-*i*. In response to a reset register write, the vKBC 128-*i* determines whether a specified value has been written to the reset register 116-*i*. For example, the reset register write detection logic in the vKBC 128-*i* can compare the value written to the reset register 116-*i* to the specified value; if the written value matches the specified value, then an activation of a reset port has occurred.

If the reset register write detection logic in the vKBC 128-*i* detects a write of the specified value to the reset register 116-*i*, then the vKBC 128-I can signal an interrupt to the processor 154 (FIG. 1B) inside the platform controller 108, such as using a respective reset indication 124-*i*. The reset indication 124-*i* can include a signal, an interrupt, a command, or any other indication of a reset. The reset indication 124-*i* can include information that identifies which VF 150-*i* the reset indication 124-*i* is associated with.

In response to the reset indication 124-*i*, machine-readable instructions (e.g., firmware) running on the processor 154 can redirect the reset indication 124-*i* to the hypervisor 106. In other examples, the vKBC 128-*i* contains hardware that redirects the reset indication 124-*i* to the hypervisor.

The redirected reset indication 124-*i* (or information based on the reset indication 124-*i*) can be received by the hypervisor 106. In response to the redirected reset indication 124-*i*, the hypervisor 106 causes a reset of a respective VM i.

Figure 2B:
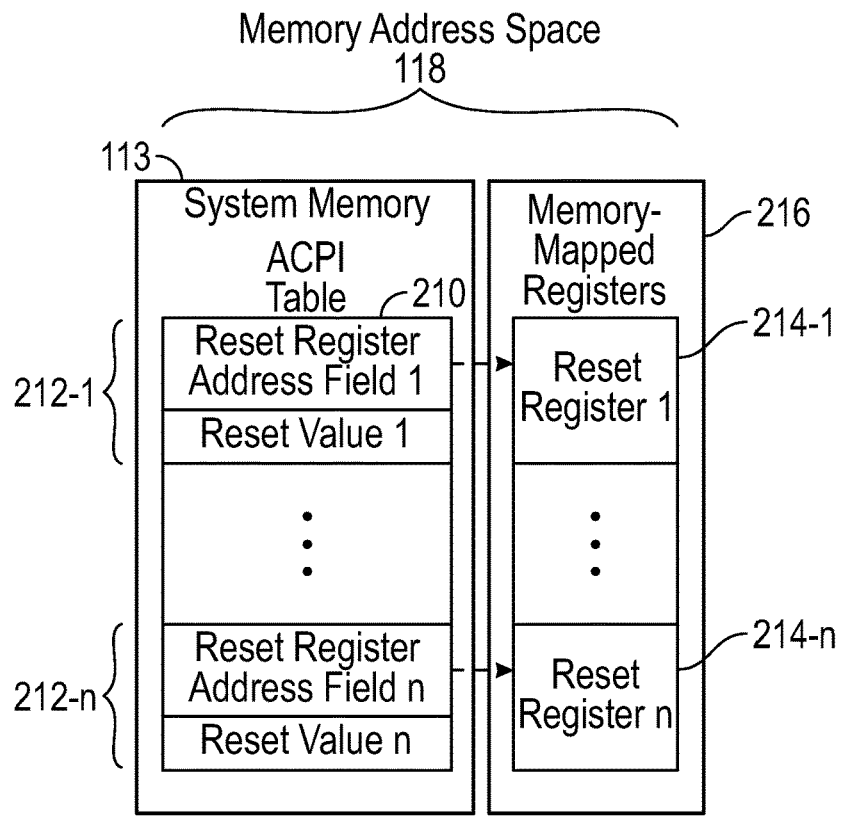

In other examples, instead of providing VFs in a platform controller for emulating reset ports, an Advanced Configuration and Power Interface (ACPI) table 210, as shown in FIG. 2B, is used for storing reset register related information in accordance with further implementations of the present disclosure. In some examples, the ACPI table 210 is a Fixed ACPI Description Table (FADT). The FADT includes various configuration details related to registers. The ACPI table 210 is part of the memory address space 118 contained in the system memory 113.

In accordance with some implementations of the present disclosure, the ACPI table 210 contains multiple sections 212-1 to 212-*n* that are associated with respective VMs 1 to n. The ACPI table section 212-1 includes a reset register address field 1 and a reset value 1, and the ACPI table section 212-*n* includes a reset register address field n and a reset value n. Each reset register address field i (i=1 to n) in the corresponding ACPI table section 212-*i* contains the address of a memory location that contains a reset register 214-*i* for a corresponding VM i. For example, reset register address field 1 contains the memory address of the reset register 214-1 for VM 1, and reset register address field n contains the memory address of the reset register for VM n. The reset registers 214-1 to 214-*n* are similar to the reset registers 116-1 to 116-*n* of FIG. 2A, and can include registers of vKBCs 128-1 to 128-*n*, respectively, such as shown in FIG. 1A. The reset registers 214-1 to 214-*n* include memory-mapped registers (identified as region 216) that are part of the memory address space 118.

Each reset value i (i=1 to n) in the corresponding ACPI table section 212-*i* contains a reset value that if written to the corresponding reset register 214-*i* (as pointed to by the reset register address field i in the ACPI table section 212-*i*) is an indication that the respective VM i is to be reset.

In other examples, the ACPI table sections 212-1 to 212-*n* do not include reset values, but rather, a predefined reset value (e.g., FEh or another value) is used for indicating a reset of a corresponding VM.

The starting address of the region 216 can be indicated by an address contained in a BAR (not shown), for example.

In some examples, the addresses of the reset registers 214-1 to 214-*n* can be assigned by the hypervisor 106 (FIG. 1A). The hypervisor 106 can write the reset register addresses to the corresponding reset register address fields of the ACPI table sections 212-1 to 212-*n*.

The hypervisor 106 can also assign the reset values that are written to corresponding ACPI table sections 212-1 to 212-*n*.

In other examples, the addresses of the reset registers 214-1 to 214-*n* and the reset values can be assigned by another entity (e.g., a host OS or a basic input/output system (BIOS)).

In response to a write of a reset register 214-*i* (i=1 to n), the reset register write detection logic in the vKBC 128-*i* (FIG. 1A) can determine whether the value written to the reset register 214-*i* matches a specified reset value, such as the reset value in the ACPI table section 210-*i* or a predefined value.

If the value written to the reset register 214-*i* matches the specified reset value, then the reset register write detection logic in the vKBC 128-*i* can generate a reset indication 124-*i* (similar to the reset indication 124-*i* of FIG. 1B), which is redirected by the platform controller 108 to the hypervisor 106 to cause reset of the corresponding VM i.

In any of the implementations discussed above, if a value written to a reset register does not match a specified reset value, then the platform controller 108 does not issue the reset indication to the hypervisor 106, such that the hypervisor 106 is not interrupted with reset activities. Thus, an infected or misbehaving VM that issues many writes to reset registers would not cause activities of the hypervisor 106 to be interrupted if the reset register writes are not of the specified reset value(s).

Figure 3:
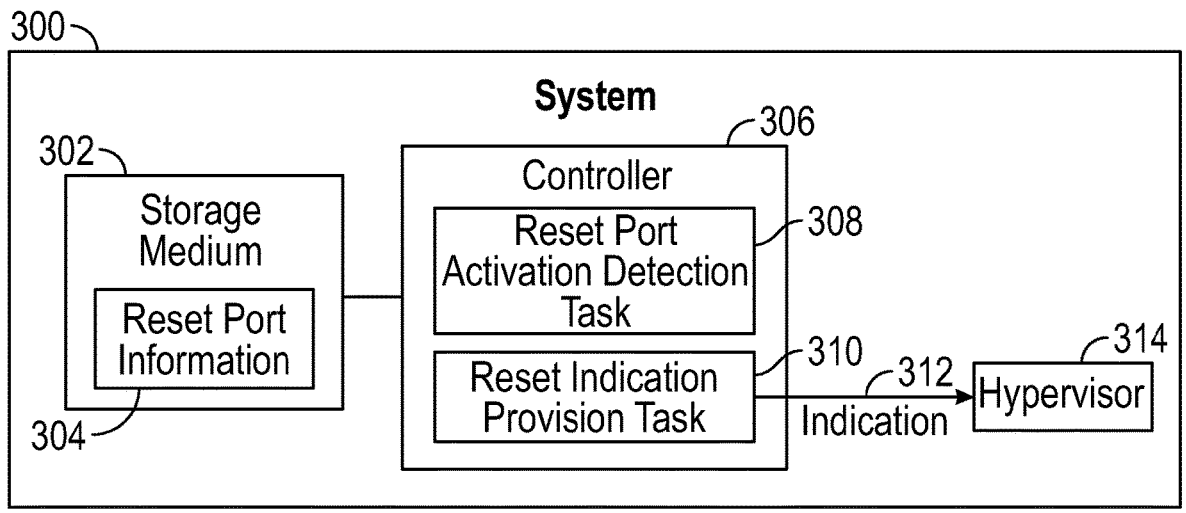
FIG. 3 is a block diagram of a system according to further examples.

FIG. 3 is a block diagram of a system 300 according to further examples. The system 300 includes a storage medium 302 (e.g., the system memory 113 of FIG. 1A or another device memory) to store reset port information 304 relating to reset ports associated with respective VMs. The reset ports can include keyboard controller reset ports.

In the example of FIG. 1B, the reset port information 304 includes the addresses of the reset registers 116-1 to 116-*n*, which can be derived from the BAR 120 or can be stored in other locations.

In the example of FIG. 2B, the reset port information 304 includes information in the ACPI table sections 212-1 to 212-*n*, which contain reset register addresses.

The system 300 further includes a controller 306 (e.g., the platform controller 108 of FIG. 1A) to perform various tasks.

The tasks of the controller 306 include a reset port activation detection task 308 to detect, based on the reset port information 304, an activation of a first reset port associated with a first VM.

The tasks of the controller 306 include a reset indication provision task 310 to, in response to the detecting of the activation of the first reset port, provide an indication 312 of the activation of the first reset port to a hypervisor 314 (e.g., 106 in FIG. 1A) that is separate from the controller 306, where the indication is to cause the hypervisor 314 to reset the first VM without the hypervisor 314 emulating a keyboard controller.

In some examples, the detection of the activation of the first reset port includes a detection of a write to a specified address associated with the first reset port (e.g., a write to a reset register).

In some examples, the reset port information 304 includes PCI register information (e.g., the BAR 120 of FIG. 1B or the ACPI table sections 212-1 to 212-*n* of FIG. 2B) that maps the reset registers to different memory address locations for the respective VMs.

In some examples the reset registers are associated with respective PCI VFs assigned to the respective VMs, where the PCI VFs are provided by the controller 306.

In some examples, the reset registers are I/O space reset registers. In other examples, the reset registers are memory space reset registers.

Figure 4:
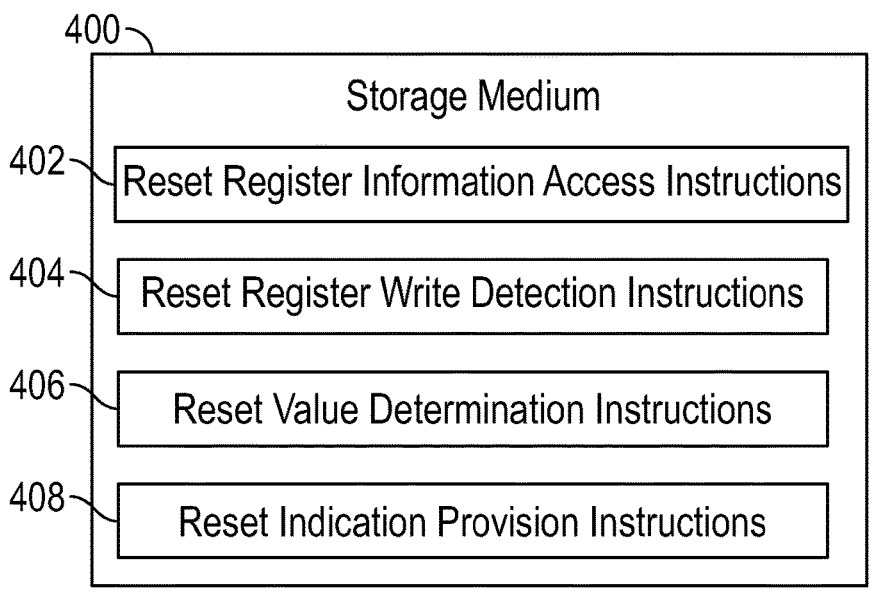
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a controller to perform specified tasks.

The machine-readable instructions include reset register information access instructions 402 to access information relating to reset registers associated with respective VMs.

The machine-readable instructions further include reset register write detection instructions 404 to detect, based on the information, a write of a first reset register associated with a first VM.

The machine-readable instructions further include reset value determination instructions 406 to determine whether a specified reset value is written to the first reset register.

The machine-readable instructions further include reset indication provision instructions 408 to, in response to the determination that the specified reset value is written to the first reset register, provide a reset indication to a hypervisor that is separate from the controller, the reset indication to cause the hypervisor to reset the first VM.

Figure 5:
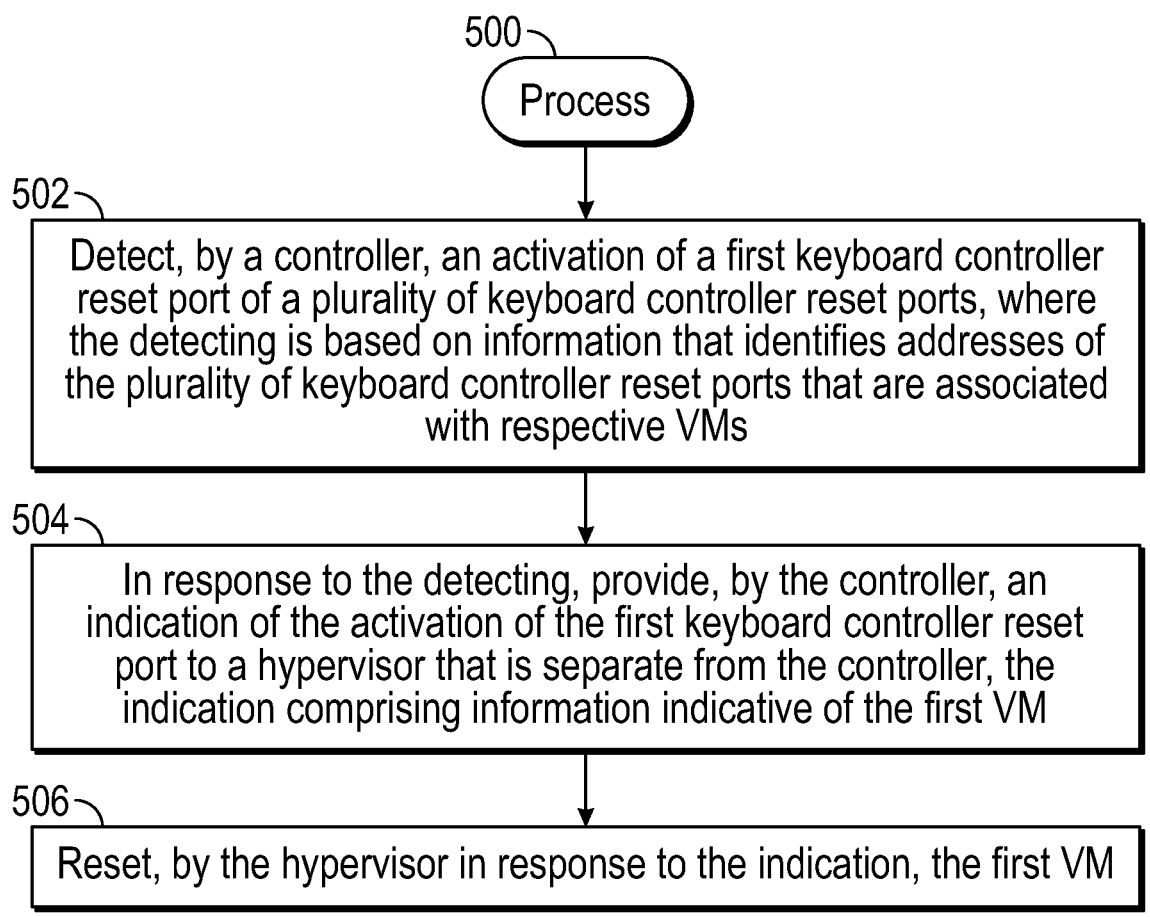
FIG. 5 is a flow diagram of a process according to some examples.

FIG. 5 is a flow diagram of a process 500 according to some examples. The process 500 includes detecting (at 502), by a controller (e.g., 108 in FIG. 1, 208 in FIG. 2, 306 in FIG. 3), an activation of a first keyboard controller reset port of a plurality of keyboard controller reset ports, where the detecting is based on information that identifies addresses of the plurality of keyboard controller reset ports that are associated with respective VMs.

In response to the detecting, the process 500 includes providing (at 504), by the controller, an indication of the activation of the first keyboard controller reset port to a hypervisor that is separate from the controller, the indication comprising information indicative of the first VM.

The process 500 includes resetting (at 506), by the hypervisor in response to the indication, the first VM.

The storage medium 400 of FIG. 4 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
    a storage medium to store information relating to reset ports associated with respective virtual machines (VMs) of a plurality of VMs executing in the system, the reset ports emulated by corresponding virtual keyboard controllers (vKBCs), and each VM of the plurality of VMs including a keyboard controller device driver to communicate with a respective vKBC of the vKBCs;
    a hypervisor; and
    a controller comprising a processor, the controller to:
        execute a plurality of virtual functions (VFs), wherein each VM of the plurality of VMs is assigned a respective VF, and wherein each VF implements a vKBC associated with a corresponding VM that emulates a reset port for the corresponding VM;
        detect, based on the information, an activation of a first reset port associated with a first VM of the plurality of VMs, wherein the activation of the first reset port comprises a write to a specified address associated with a first vKBC of the vKBCs, and
        in response to the detecting, provide, from the first vKBC, an indication of the activation of the first reset port to the hypervisor that is separate from the controller,
    the hypervisor to:
        receive the indication of the activation of the first reset port, and
        reset the first VM in response to the indication.

2. The system of claim 1, wherein the activation of the first reset port is responsive to an action at the first VM.

3. The system of claim 1, wherein the specified address is an address of a reset register of the first vKBC, and wherein the information relates to reset registers at different address locations for the respective VMs, the reset registers being part of the corresponding vKBCs.

4. The system of claim 3, wherein the information is to be derived from register information and maps the reset registers to different memory address locations for the respective VMs.

5. The system of claim 4, wherein the information further comprises an Advanced Configuration and Power Interface (ACPI) table comprising a plurality of reset register address fields associated with the respective VMs, each respective reset register address field of the plurality of reset register address fields containing an address of a corresponding memory address location of the different memory address locations.

6. The system of claim 5, wherein the ACPI table further comprises reset values that are to be written to the reset registers to perform resets of the respective VMs.

7. The system of claim 5, wherein the ACPI table is a Fixed ACPI Description Table (FADT).

8. The system of claim 3, wherein the reset registers are input/output (I/O) space reset registers.

9. The system of claim 3, wherein the reset registers are memory space reset registers.

10. The system of claim 1, comprising at least one system processor to execute the plurality of VMs and the hypervisor, wherein the controller is separate from the at least one system processor.

11. The system of claim 1, wherein the controller is to provide the indication to cause the hypervisor to reset the first VM without the hypervisor emulating a keyboard controller.

12. The system of claim 1, further comprising a bus, the controller comprising a bus device connected to the bus.

13. A non-transitory machine-readable storage medium comprising instructions that upon execution cause a system to:
    access, with a controller, information relating to reset ports associated with respective virtual machines (VMs) of a plurality of VMs executed by at least one processor of the system, wherein the controller is separate from the at least one processor, the reset ports are emulated by corresponding virtual keyboard controllers (vKBCs), and each VM of the plurality of VMs includes a keyboard controller device driver to communicate with a respective vKBC of the vKBCs;
    execute, at the controller, a plurality of virtual functions (VFs), wherein each VM of the plurality of VMs is assigned a respective VF, and wherein each VF implements a vKBC associated with a corresponding VM that emulates a reset port for the corresponding VM;
    detect, at the controller based on the information, an activation of a first reset port associated with a first VM of the plurality of VMs, wherein the activation of the first reset port comprises a write to a specified address associated with a first vKBC of the vKBCs;
    in response to the detecting, provide, from the first vKBC, an indication of the activation of the first reset port to a hypervisor executed by the at least one processor;
    receive, at the hypervisor, the indication of the activation of the first reset port, and
    reset, with the hypervisor, the first VM in response to the indication.

14. The non-transitory machine-readable storage medium of claim 13, wherein the information comprises a register containing an address to derive addresses of reset registers corresponding to the reset ports.

15. The non-transitory machine-readable storage medium of claim 14, wherein the reset registers are part of the corresponding vKBCs, and wherein the specified address is an address of a reset register that is part of the first vKBC.

16. The non-transitory machine-readable storage medium of claim 13, wherein the information comprises addresses of reset registers in a plurality of segments in a memory, the reset registers corresponding to the reset ports.

17. The non-transitory machine-readable storage medium of claim 16, wherein the information further comprises an Advanced Configuration and Power Interface (ACPI) table comprising a plurality of reset register address fields associated with the respective VMs, each respective reset register address field of the plurality of reset register address fields containing an address of a corresponding memory address location including a respective reset register of the reset registers.

18. A method comprising:
accessing, by a controller, information relating to reset ports associated with respective virtual machines (VMs) of a plurality of VMs executing in a system, the reset ports emulated by corresponding virtual keyboard controllers (vKBCs), and each VM of the plurality of VMs including a keyboard controller device driver to communicate with a respective vKBC of the vKBCs;
executing, by the controller, a plurality of virtual functions (VFs), wherein each VM of the plurality of VMs is assigned a respective VF, and wherein each VF implements a vKBC associated with a corresponding VM that emulates a reset port for the corresponding VM;
detecting, by the controller based on the information, an activation of a first reset port associated with a first VM of the plurality of VMs, wherein the activation of the first reset port comprises a write to a specified address associated with a first vKBC of the vKBCs;
in response to the detecting, providing, from the first vKBC, an indication of the activation of the first reset port to a hypervisor that is separate from the controller, the indication comprising information indicative of the first VM; and
resetting, by the hypervisor in response to the indication, the first VM.

19. The method of claim 18, wherein the information comprises:
a Peripheral Component Interconnect (PCI) register containing an address to be used in deriving addresses of the reset ports, wherein the plurality of VFs comprise PCI virtual functions.

20. The method of claim 18, wherein the information comprises:
an Advanced Configuration and Power Interface (ACPI) table comprising a plurality of address fields associated with the respective VMs, each respective address field of the plurality of address fields containing an address of a corresponding memory address location including a respective register associated with a respective reset port of the reset ports.

* * * * *